US012063675B2

United States Patent
Kanno et al.

(10) Patent No.: US 12,063,675 B2
(45) Date of Patent: Aug. 13, 2024

(54) TERMINAL APPARATUS, BASE STATION APPARATUS, CONTROL METHOD, AND STORAGE MEDIUM IN SYSTEM THAT CAN EXECUTE FULL-DUPLEX COMMUNICATION

(71) Applicant: KDDI CORPORATION, Tokyo (JP)

(72) Inventors: Issei Kanno, Fujimino (JP); Ryochi Kataoka, Fujimino (JP); Yutaro Kurita, Fujimino (JP)

(73) Assignee: KDDI CORPORATION, Tokyo (JP)

(*) Notice: Subject to any disclaimer, the term of this patent is extended or adjusted under 35 U.S.C. 154(b) by 381 days.

(21) Appl. No.: 17/585,948

(22) Filed: Jan. 27, 2022

(65) Prior Publication Data

US 2022/0150902 A1   May 12, 2022

Related U.S. Application Data (63) Continuation of application No. PCT/JP2020/023330, filed on Jun. 15, 2020.

(30) Foreign Application Priority Data

Jul. 29, 2019 (JP) ................. 2019-138895

(51) Int. Cl.
*H04W 4/00* (2018.01)
*H04W 72/541* (2023.01)

(52) U.S. Cl.
CPC ................ *H04W 72/541* (2023.01)

(58) Field of Classification Search
CPC ........ H04W 72/541; H04W 8/22; H04W 8/24
See application file for complete search history.

(56) References Cited

U.S. PATENT DOCUMENTS

| | | | |
|---|---|---|---|
| 2015/0016309 A1 | 1/2015 | Fang et al. | |
| 2017/0170946 A1 | 6/2017 | Min et al. | |
| 2018/0212746 A1* | 7/2018 | Kazmi | ................. H04L 5/14 |
| 2018/0295630 A1 | 10/2018 | Cirkic et al. | |

FOREIGN PATENT DOCUMENTS

| | | | | |
|---|---|---|---|---|
| CN | 102340817 A | * | 2/2012 | |
| CN | 102388666 A | * | 3/2012 | .......... H04W 72/082 |
| CN | 102823304 A | * | 12/2012 | .......... H04W 52/242 |
| CN | 105978614 A | * | 9/2016 | .......... H04B 7/0417 |

(Continued)

OTHER PUBLICATIONS

A. Koc and T. Le-Ngoc, "Intelligent Non-Orthogonal Beamforming With Large Self-Interference Cancellation Capability for Full-Duplex Multiuser Massive MIMO Systems," in IEEE Access, vol. 10, pp. 51771-51791, 2022, doi: 10.1109/Access.2022.3173618. (Year: 2022).*

(Continued)

*Primary Examiner* — Thai D Hoang
(74) *Attorney, Agent, or Firm* — Foley & Lardner LLP (57) ABSTRACT

A terminal apparatus notifies, when transmitting an uplink second signal to a base station apparatus using a wireless resource that is used when receiving a downlink first signal transmitted from the base station apparatus, the base station apparatus of information indicating whether or not the terminal apparatus has a capability of suppressing influence of interference of the second signal on the first signal.

15 Claims, 4 Drawing Sheets

(56) References Cited

FOREIGN PATENT DOCUMENTS

| | | | | | |
|---|---|---|---|---|---|
| CN | 104272706 | B | * | 11/2018 | ......... H04L 47/2475 |
| CN | 105978614 | B | * | 5/2019 | ........... H04B 7/0417 |
| EP | 2 966 885 | A1 | | 1/2016 | |
| JP | 2004328319 | A | * | 11/2004 | ............... H04L 1/06 |
| JP | 2009044589 | A | * | 2/2009 | |
| JP | 2017-523687 | A | | 8/2017 | |
| WO | WO-2011106977 | A1 | * | 9/2011 | .......... H04W 52/242 |
| WO | WO-2019/142524 | A1 | | 7/2019 | |
| WO | WO-2022103962 | A2 | * | 5/2022 | |

OTHER PUBLICATIONS

D. Korpi and M. A. Uusitalo, "Reinforcement Learning Based Inter-User-Interference Suppression in Full-Duplex Networks," 2021 IEEE 93rd Vehicular Technology Conference (VTC2021-Spring), Helsinki, Finland, 2021, pp. 1-5, doi: 10.1109/VTC2021-Spring51267.2021.9448931. (Year: 2021).*

Chiung-Jang Chen and Li-Chun Wang, "Suppressing opposite-direction interference in TDD/CDMA systems with asymmetric traffic by antenna beamforming," in IEEE Transactions on Vehicular Technology, vol. 53, No. 4, pp. 956-967, Jul. 2004, doi: 10.1109/TVT.2004.830941. (Year: 2001).*

EP Search Report on non-Foley case related to U.S. Appl. No. 17/585,948 (EP Appl. Ser. No. EP 20848465 dated Aug. 2, 2022 (11 pages).

Ipwireless: "Simultaneous Tx/Rx (Duplex) Capabilities of LTE," 3GPP Draft; R2-071414, 3rd Generation Partnership Project (3GPP), Mobile Competence Centre, 650, Route Des Lucioles, F-06921 Sophia-Antipolis Cedex, Retrieved Mar. 22, 2007 (3 pages).

Bai et al., "Increasing Cellular Capacity Using ISM Band Side-channels: a first study", AllThingsCellular'14: Proceedings of the 4th workshop on All things cellular: Operations, Applications, & Challenges, Aug. 2014, pp. 9-14.

Sundaresan et al., "Full-duplex without Strings: Enabling Full-duplex with Half-duplex Clients", NEC Laboratories America, Sep. 2014 pp. 1-21.

* cited by examiner

TERMINAL APPARATUS, BASE STATION APPARATUS, CONTROL METHOD, AND STORAGE MEDIUM IN SYSTEM THAT CAN EXECUTE FULL-DUPLEX COMMUNICATION

CROSS-REFERENCE TO RELATED APPLICATION(S)

This application is a continuation of International Patent Application No. PCT/JP2020/023330 filed on Jun. 15, 2020, which claims priority to and the benefit of Japanese Patent Application No. 2019-138895 filed Jul. 29, 2019, the entire disclosures of which are incorporated herein by reference.

BACKGROUND OF THE INVENTION

Field of the Invention

The present invention relates to a terminal apparatus, a base station apparatus, a control method, and a storage medium, and in particular relates to a communication control technique for a system that can execute full-duplex communication.

Description of the Related Art

In general, cellular communication systems adopt a half-duplex communication scheme for performing communication using different resources for downlink in which a signal is transmitted from a base station apparatus to a terminal apparatus and uplink in which a signal is transmitted from the terminal apparatus to the base station apparatus. That is to say, in general, FDD (frequency division duplex) for performing communication using frequency resources different for uplink and downlink and TDD (time division duplex) for performing communication using time resources different for uplink and downlink are adopted. Accordingly, it is possible to prevent interference from occurring between uplink and downlink.

On the other hand, it is possible to further improve the frequency usage efficiency and facilitate more flexible use of wireless resources by adopting a full-duplex communication scheme in which wireless resources are not divided for uplink and downlink. However, in this case, interference occurs between uplink and downlink. When a terminal apparatus receives a downlink signal from a base station apparatus, for example, an uplink signal transmitted to the base station apparatus by the terminal apparatus may loop back, and thereby causing interference to the downlink signal. When a terminal apparatus that cannot handle such an interference executes uplink communication and downlink communication at the same time, there may be cases where these communications fail, and as a result, the frequency usage efficiency decreases.

SUMMARY OF THE INVENTION

The present invention provides a technique that enables efficient execution of full-duplex communication.

A terminal apparatus according to a mode of the present invention includes: a notification unit configured to notify, when transmitting an uplink second signal to a base station apparatus using a wireless resource that is used when receiving a downlink first signal transmitted from the base station apparatus, the base station apparatus of information indicating whether or not the terminal apparatus has a capability of suppressing influence of interference of the second signal on the first signal.

A base station apparatus according to another mode of the present invention includes: an obtaining unit configured to obtain, when a terminal apparatus transmits an uplink second signal to the base station apparatus using a wireless resource that is used when the terminal apparatus receives a downlink first signal transmitted from the base station apparatus, information indicating whether or not the terminal apparatus has a capability of suppressing influence of interference of the second signal on the first signal; and an executing unit configured to execute allocation of wireless resources that are used for communication between the base station apparatus and the terminal apparatus, based on the information.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

Figure 1:
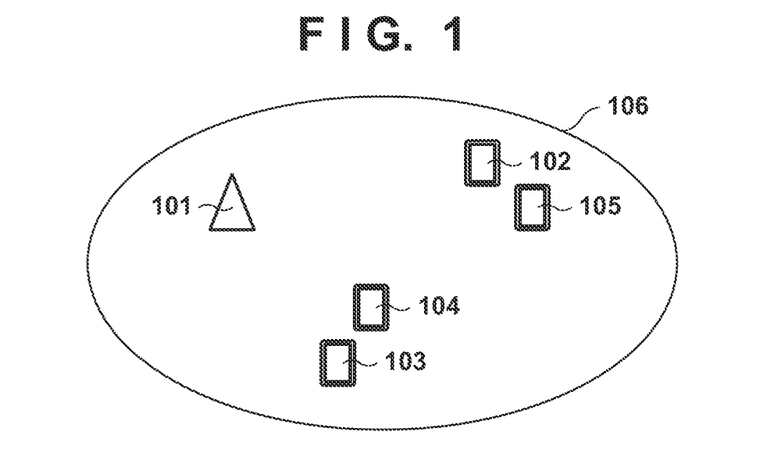
FIG. 1 is a diagram showing an exemplary configuration of a wireless communication system.

FIG. 1 shows an exemplary configuration of a wireless communication system according to an embodiment of the present invention. This wireless communication system is a cellular wireless communication system, for example, and is constituted by a base station apparatus 101 and terminal apparatuses 102 to 105 that are present in a range 106 in which the base station apparatus 101 is communicable. Note that the example in FIG. 1 shows one base station apparatus and four terminal apparatuses, but, as a matter of course, but there may be two or more base station apparatuses and three or fewer terminal apparatuses or five or more terminal apparatuses.

Here, it is assumed that the base station apparatus 101 can comply with a full-duplex communication scheme (supports a full-duplex communication scheme) in which shared wireless resources (resources such as frequency/time/space) are used in downlink communication and uplink communication with one or more terminal apparatuses. Note that downlink is wireless link in a direction from the base station apparatus to a terminal apparatus, and uplink is wireless link in a direction from a terminal apparatus to the base station apparatus. Here, the base station apparatus 101 is configured such that downlink transmission of a signal and uplink transmission of a signal do not affect each other. Specifically, the base station apparatus 101 may have an apparatus configuration in which loop-back interference does not occur in which a signal transmitted in downlink interferes with a signal transmitted from the terminal apparatus due to the signal transmitted in downlink being received as an uplink signal. An uplink antenna and a downlink antenna are separately prepared, and are disposed at locations sufficiently spaced apart from each other, for example, whereby it is possible to sufficiently suppress the influence of loop-back interference. In addition, the base station apparatus 101 may also be configured to remove loop-back interference using an interference cancelling function to sufficiently decrease the influence of loop-back interference.

On the other hand, there can be case where the terminal apparatuses 102 to 105 cannot sufficiently suppress the influence of loop-back interference. Specifically, there may be cases where, due to the restriction of the size of a housing of a terminal apparatus, a transmission/reception antenna cannot be spaced apart from the terminal apparatus by a sufficient distance, for example, and, due to the restrictions of the power capacity, the circuit size, and the cost, the performance of the interference removing function is low and it is even impossible to have the interference removing function. If the base station apparatus 101 allocates uplink wireless resources and downlink wireless resources at the same time to a terminal apparatus that cannot sufficiently suppress the influence of such loop-back interference, receiving of a downlink signal may fail due to an uplink signal transmitted by the terminal apparatus. As a result, for example, a downlink signal may be retransmitted, degrading the frequency usage efficiency. On the other hand, also if wireless resources different for uplink and downlink are allocated to a terminal apparatus that can sufficiently suppress the influence of loop-back interference, the frequency usage efficiency cannot be improved using the capability of the terminal apparatus.

Therefore, in this embodiment, the base station apparatus 101 performs determination on allocation of wireless resources based on whether or not each terminal apparatus has a capability of suppressing the influence of loop-back interference. Hereinafter, this capability of suppressing the influence of loop-back interference is referred to as a "self-interference suppressing capability". The self-interference suppressing capability is, for example, an interference cancelling capability of multiplying a signal transmitted in uplink by an estimated value of a transmission path of the uplink signal until the signal is received as the downlink signal, and subtracting the resultant value from a downlink signal, the capability being performed by a terminal apparatus. Note that it is assumed that loop-back interference is suppressed by a general conventional technique, and a detailed description is omitted here.

In an example, each of the terminal apparatuses 102 to 105 notifies the base station apparatus 101 of information indicating whether or not the terminal apparatus has the self-interference suppressing capability. Note that a configuration may also be adopted in which, for example, each of the terminal apparatuses 102 to 105 notifies the base station apparatus 101 of the model information and information such as the apparatus category of the terminal apparatus and the base station apparatus 101 determines whether or not the terminal apparatus has the self-interference suppressing capability based on such information. In addition, for example, the base station apparatus 101 may obtain information regarding the self-interference suppressing capability of each terminal apparatus from a node that holds information regarding the capability of the terminal apparatus (for example, another base station apparatus that is a source of handover when the terminal apparatus has performed handover to the base station apparatus 101). In addition, for example, when the value of the version of the standard that the terminal apparatus complies with corresponds to a version before a predetermined version, the base station apparatus 101 may determine that the terminal apparatus does not have the self-interference suppressing capability.

The base station apparatus 101 determines, for example, that wireless resources shared between uplink communication and downlink communication are allowed to be allocated to a terminal apparatus that has the self-interference suppressing capability. On the other hand, the base station apparatus 101 may determine that wireless resources different for uplink communication and downlink communication need to be allocated to a terminal apparatus that does not have the self-interference suppressing capability. Accordingly, it is possible to allow the same wireless resources for uplink communication and downlink communication to be allocated to a terminal apparatus that has the self-interference suppressing capability, and to improve the frequency usage efficiency of the terminal apparatus. On the other hand, it is possible to prevent interference of uplink communication on downlink communication from occurring, by the same wireless resources not being allocated for uplink communication and downlink communication of a terminal apparatus that does not have the self-interference suppressing capability.

Figure 2:
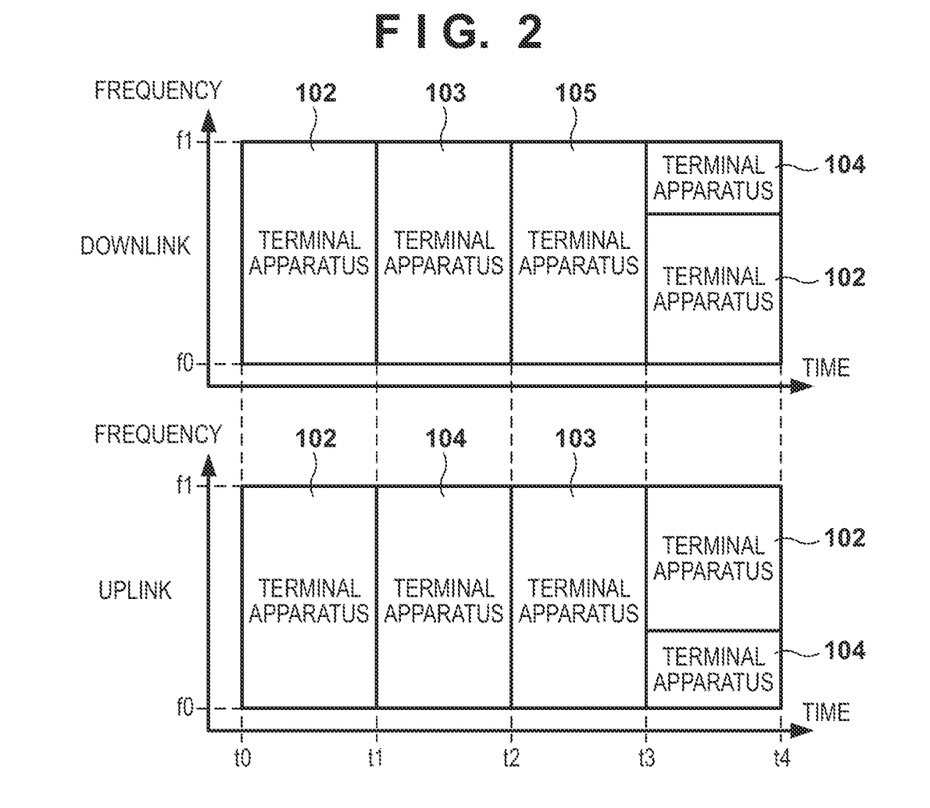
FIG. 2 is a diagram showing an example of wireless resource allocation that is based on capability information of terminal apparatuses.

In an example, FIG. 2 shows an example of allocation of time and frequency resources when the terminal apparatus 102 has the self-interference suppressing capability and the terminal apparatuses 103 to 105 do not have the self-interference suppressing capability. In this example, the same frequency resources (a frequency band between a frequency f0 to a frequency f1) and the same time resources (a time section between time t0 to time t1) are allocated for uplink communication and downlink communication of the terminal apparatus 102 that has the self-interference suppressing capability.

On the other hand, the terminal apparatuses 103 to 105 do not have the self-interference suppressing capability, and thus, for example, in a time section of time t1 to time t2, wireless resources are allocated for downlink communication of the terminal apparatus 103, and the same wireless resources are allocated for uplink communication of the terminal apparatus 104. That is to say, wireless resources that are allocated for downlink communication of a terminal apparatus that does not have the self-interference suppressing capability are allocated for uplink communication of a terminal apparatus different from the terminal apparatus. Similarly, in a time section of time t2 to time t3, wireless resources are allocated for downlink communication of the terminal apparatus 105, and the same wireless resources are allocated for uplink communication of the terminal apparatus 103.

In addition, as in a time section of time t3 to time t4, some frequency resources may be allocated to each of the terminal apparatuses. In this case, it is possible to allocate frequency sections different for uplink communication and downlink communication, even to the terminal apparatus 104 that does not have the self-interference suppressing capability, for example, such that an uplink signal does not directly affect a downlink signal. Note that, in this case, for example, the terminal apparatus 104 can decrease the influence of the uplink signal using a filter, and thus it can be said in a broad sense that the terminal apparatus 104 has the self-interference suppressing capability. However, in this embodiment, the capability of suppressing the interference of an uplink signal received at the same time and the same frequency (which cannot be suppressed using a filter) is referred to as "self-interference suppressing capability".

Note that, in addition to the information regarding whether or not each terminal apparatus has the self-interference suppressing capability, the base station apparatus 101 may obtain information regarding whether or not each terminal apparatus can execute uplink communication and downlink communication in parallel. Allocation of wireless resources in which different frequencies are used in the same time period, such as allocation to the terminal apparatus 104 in a time section of time t3 to time t4 in FIG. 2, may be performed for a terminal apparatus that can execute such parallel communication and does not have the self-interference suppressing capability.

In addition, when wireless resources shared between uplink and downlink are used, an uplink signal transmitted from one terminal apparatus may interfere with a downlink signal that is to be received by another terminal apparatus. Therefore, even a terminal apparatus that can suppress loop-back interference may fail in receiving a downlink signal, as a result of being affected by interference of an uplink signal from the other terminal apparatus. Therefore, the base station apparatus 101 may execute wireless resource allocation that takes interference between these terminal apparatuses into consideration. Therefore, the base station apparatus 101 may obtain, from each of the terminal apparatuses 102 to 105, information regarding the propagation characteristics such as propagation loss between the terminal apparatus and another terminal apparatus. That is to say, when each terminal apparatus transmits a signal, the base station apparatus 101 obtains information for making it possible to estimate a degree of power with which the signal reaches another terminal apparatus. The terminal apparatus 102 measures a predetermined signal such as a reference signal transmitted from each of the terminal apparatuses 103 to 105 with predetermined power, and obtains propagation characteristics such as propagation loss based on the measurement result, for example. The terminal apparatus 102 may then notify information indicating the obtained propagation characteristics to the base station apparatus 101. Similarly, the terminal apparatus 103 may measure a predetermined signal such as a reference signal transmitted from the terminal apparatuses 102, 104 and 105 with the predetermined power, obtain information regarding propagation characteristics, and notify the base station apparatus 101 of the information. Similarly, each of the terminal apparatuses 104 and 105 may also obtain information regarding propagation characteristics between the terminal apparatus and another terminal apparatus, and notifies the base station apparatus 101 of the information.

When allocating wireless resources for uplink communication of one of two terminal apparatuses between which the propagation loss is small, the base station apparatus 101 does not allocate the same frequency resources in the same time period for downlink communication of the other of these two terminal apparatuses. Similarly, when allocating wireless resources for downlink communication of one of two terminal apparatuses between which the propagation loss is small, the base station apparatus 101 does not allocate the same frequency resources in the same time period for uplink communication of the other. That is to say, the base station apparatus 101 executes allocation of wireless resources under the assumption that, when the propagation loss between two terminal apparatuses is large (for example, than a predetermined value), wireless resources are allocated for communication of one of these two terminal apparatuses, and the same wireless resources are allowed to be allocated for communication of the other of these two terminal apparatuses. Accordingly, it is possible to prevent a wireless signal that is transmitted in uplink by one terminal apparatus from strongly interfering with a signal transmitted in downlink by another terminal apparatus.

Figure 3:
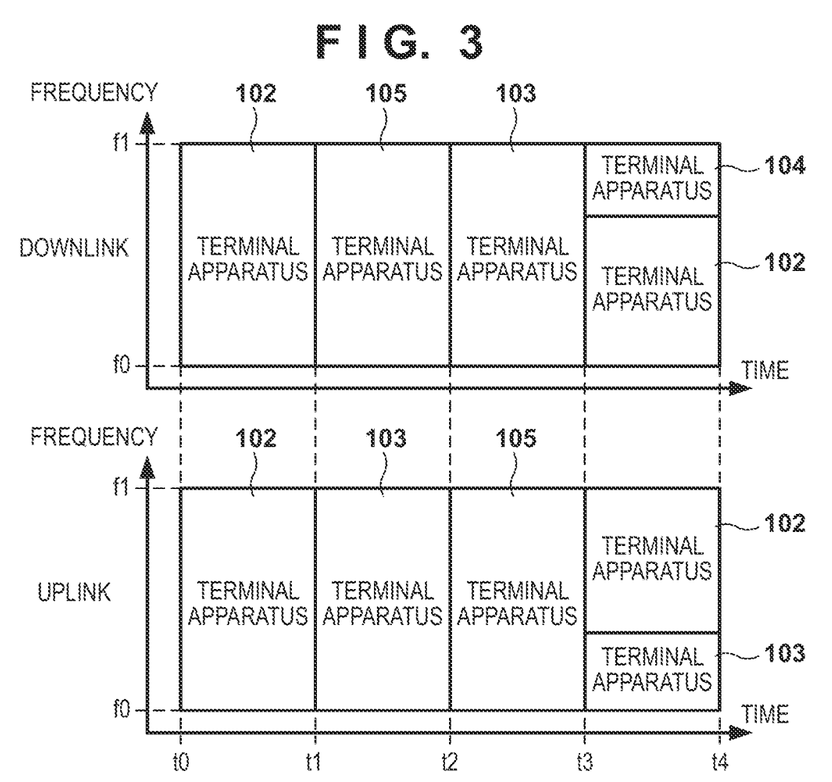
FIG. 3 is a diagram showing an example of wireless resource allocation that is based on capability information of terminal apparatus and information regarding propagation characteristics between terminal apparatuses.

As an example, assume that, in the example in FIG. 1, the terminal apparatuses 102 and 105 are close to each other, with propagation loss therebetween being smaller than a predetermined value, and similarly, the terminal apparatuses 103 and 104 are close to each other, with the propagation loss therebetween being smaller than the predetermined value. In addition, propagation loss between the terminal apparatus 102 and the terminal apparatus 103 or 104 is larger than the predetermined value, and the propagation loss between the terminal apparatus 105 and the terminal apparatus 103 or 104 is larger than the predetermined value. Accordingly, for example, when wireless resources are allocated for uplink of the terminal apparatus 102, the same wireless resources are not allowed to be allocated for downlink of the terminal apparatus 105. Similarly, for example, when wireless resources are allocated for uplink of the terminal apparatus 103, the same wireless resources are not allowed to be allocated for downlink of the terminal apparatus 104. On the other hand, for example, when wireless resources are allocated for uplink of the terminal apparatus 102 or the terminal apparatus 105, the same wireless resources are allowed to be allocated for downlink of the terminal apparatus 103 or the terminal apparatus 104. FIG. 3 shows an example of allocation of wireless resources that is based on such assumption. Note that an example has been described in which, in the time section of time t3 to time t4, wireless resources are allocated to the terminal apparatus 103 and the terminal apparatus 104 in the same time period, but frequency resources allocated to these terminal apparatuses are different, and thus mutual influence of interference can be kept sufficiently small.

Note that, in the above-described example, a case has been described in which the base station apparatus 101 obtains information regarding propagation characteristics between terminal apparatuses, from a terminal apparatus, but there is no limitation to this. A configuration can be adopted in which, for example, when the base station apparatus 101 can form a plurality of beams, wireless resources allocated for downlink communication of one terminal apparatus out of two or more terminal apparatuses included in the range of the same beam are allocated for uplink communication of another terminal apparatus out of the two or more terminal apparatuses. This is because, when two or more terminal apparatuses are included in the range of the same beam, the distance between these terminal apparatuses is estimated to be short and the propagation loss therebetween is estimated to be small. Note that a configuration can be adopted in which the base station apparatus 101 does not allocate wireless resources allocated for downlink communication of one terminal apparatus out of two or more terminal apparatus that belong to adjacent beams, for uplink communication of another terminal apparatus out of the two or more terminal apparatus. In this manner, it is possible to keep the influence of interference between terminal apparatuses sufficiently small.

Apparatus Configuration

Figure 4:
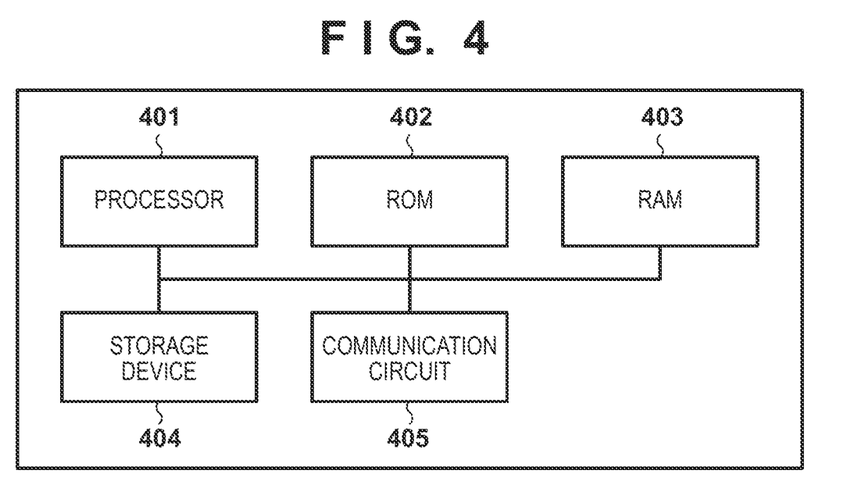
FIG. 4 is a diagram showing an exemplary hardware configuration of an apparatus.

Next, exemplary hardware configurations of the base station apparatus 101 and the terminal apparatuses 102 to 105 that execute the above-described processing will be described with reference to FIG. 4. Each of these apparatuses is constituted by a processor 401, a ROM 402, a RAM 403, a storage device 404, and a communication circuit 405, for example. The processor 401 is a computer that includes one or more processing circuits such as a general-purpose CPU (Central Processing Unit) and an ASIC (Application-Specific Integrated Circuit), and executes overall processing of the apparatus and the above-described processing by reading out and executing a program stored in the ROM 402 or the storage device 404. The ROM 402 is a read-only memory that stores information such as a program and various parameters related to processing that is executed by the apparatus. The RAM 403 functions as a work space when the processor 401 executes a program, and is also a random access memory that stores temporary information. The storage device 404 is constituted by a detachable external storage apparatus and the like. The communication circuit 405 is constituted by a circuit for wired communication or wireless communication, for example. The base station apparatus includes, for example, a baseband circuit, an RF circuit or the like, and an antenna for cellular communication as the communication circuit 405 for performing communication with a terminal apparatus. In addition, the communication circuit 405 of the base station apparatus may include, for example, a circuit for performing (wired or wireless) communication with another base station apparatus or a network node. In addition, the communication circuit 405 of each terminal apparatus is constituted by a baseband circuit, an RF circuit or the like and an antenna for cellular communication. In addition, the terminal apparatus may include the communication circuit 405 for performing communication that complies with wireless LAN or another communication standard. Note that FIG. 4 illustrates one communication circuit 405, but each apparatus may include a plurality of communication circuits.

Figure 5:
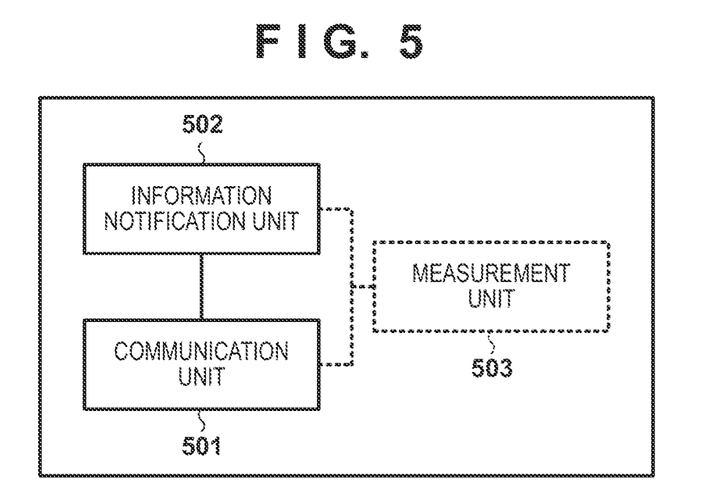
FIG. 5 is a diagram showing an exemplary function configuration of a terminal apparatus.

FIG. 5 shows an exemplary function configuration of the terminal apparatuses 102 to 105. Each terminal apparatus includes a communication unit 501 and an information notification unit 502, for example, and may obtain a measurement unit 503 in some cases. The communication unit 501 is a function unit for performing communication with a base station apparatus in accordance with a cellular communication standard. The information notification unit 502 notifies the base station apparatus of information regarding the capability of the terminal apparatus that includes the information notification unit 502. In this embodiment, in particular, the information notification unit 502 notifies the base station apparatus of information indicating whether or not the terminal apparatus has the self-interference suppressing capability. The measurement unit 503 receives, for example, a predetermined signal transmitted from another terminal apparatus with predetermined power, via the communication unit 501, and obtains information regarding the propagation characteristics such as propagation loss based on the receiving power. The obtained information regarding the propagation characteristics such as propagation loss may be notified to the base station apparatus by the information notification unit 502. Note that, in order to enable another terminal apparatus to measure the propagation characteristics, the communication unit 501 may be configured to transmit a predetermined signal (for example, reference signal) with predetermined power.

Figure 6:
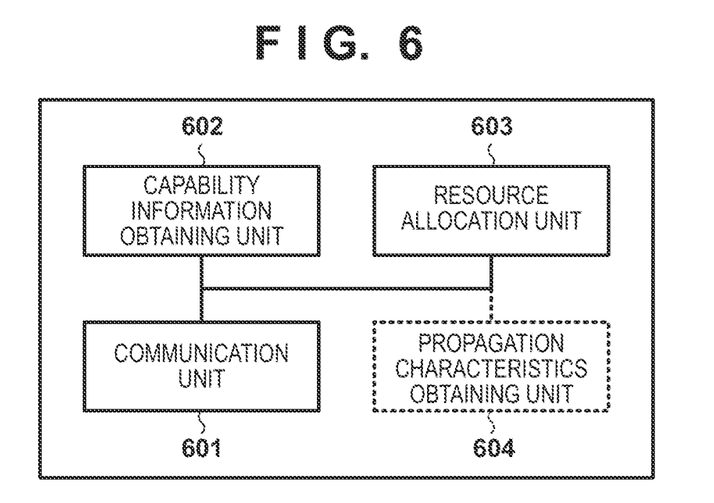
FIG. 6 is a diagram showing an exemplary function configuration of a base station apparatus.

FIG. 6 shows an exemplary function configuration of the base station apparatus 101. The base station apparatus includes, for example, a communication unit 601, a capability information obtaining unit 602, and a resource allocation unit 603, and may include a propagation characteristics obtaining unit 604 in some cases. The communication unit 601 is a function model for communicating with a terminal apparatus in accordance with a cellular communication standard. The capability information obtaining unit 602 obtains, for example, from each terminal apparatus, capability information of the terminal apparatus, in particular, information indicating whether or not the terminal apparatus has the self-interference suppressing capability. Note that the capability information obtaining unit 602 may obtain capability information of a terminal apparatus from another node on a network such as another base station apparatus that is a handover source of the terminal apparatus. The resource allocation unit 603 executes allocation of wireless resources based on the information obtained by the capability information obtaining unit 602. This allocation is performed as in FIG. 2, for example. In addition, the propagation characteristics obtaining unit 604 obtains information regarding the propagation characteristics between each terminal apparatus and another terminal apparatus. When the information regarding the propagation characteristics is obtained, the resource allocation unit 603 executes allocation of wireless resources based further on this information. This allocation is performed as in FIG. 3, for example.

Flow of Processing

Figure 7:
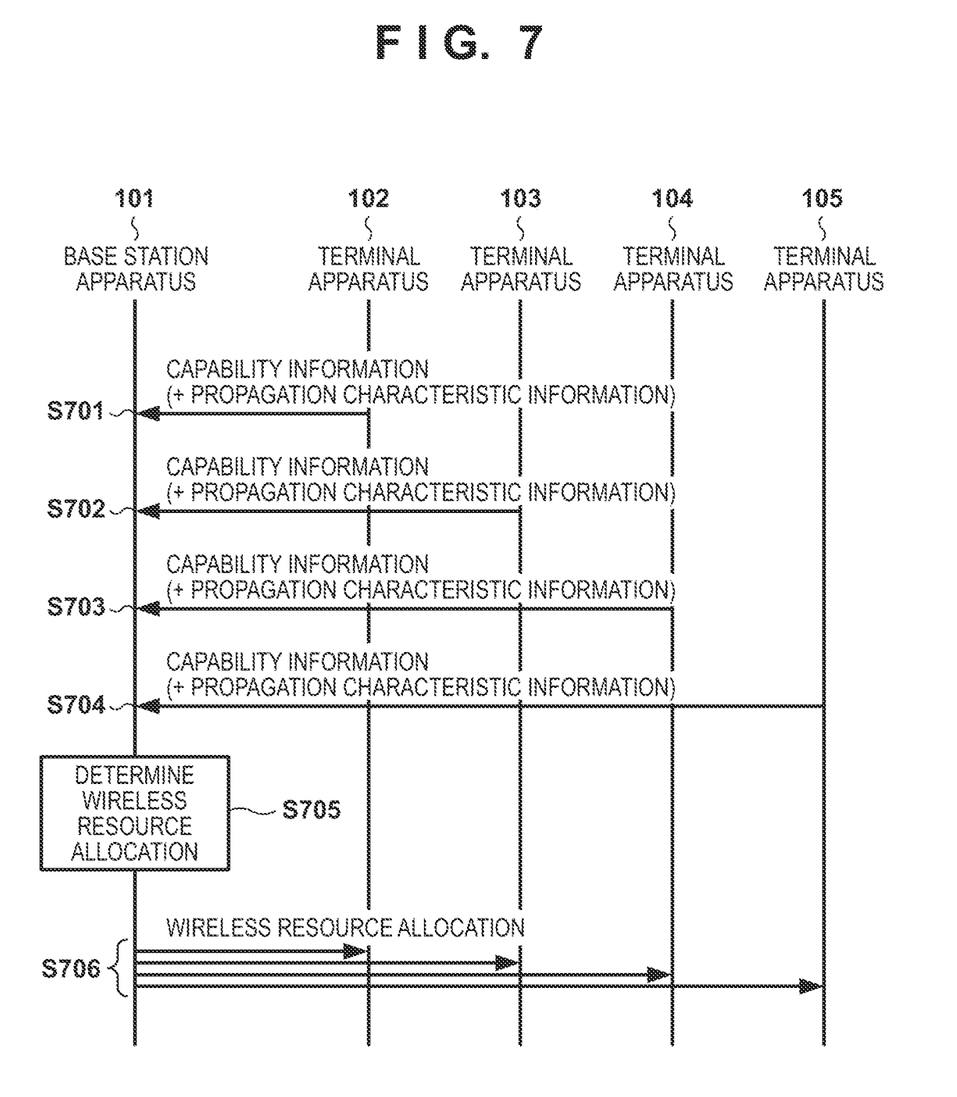
FIG. 7 is a diagram showing an example of a flow of processing that is executed by a wireless communication system.

FIG. 7 schematically describes a flow of processing that is executed by the wireless communication system according to this embodiment. In this processing, each terminal apparatus notifies the base station apparatus 101 of capability information indicating whether or not the terminal apparatus has the self-interference suppressing capability, and the base station apparatus 101 collects such capability information (steps S701 to S704). Note that, when connection is initially established from a state where connection is not established, the terminal apparatus notifies the base station apparatus 101 of the capability information thereof, and after that, while the terminal apparatus and the base station apparatus 101 are connected, the terminal apparatus does not need to notify the base station apparatus of the capability information. When the terminal apparatus moves and executes handover, for example, the base station apparatus may obtain the capability information of the terminal apparatus from another base station apparatus that is a handover source. In addition, a configuration may also be adopted in which, depending on RRC signaling and the like at the time of initial connection or handover, the terminal apparatus performs notification of capability information, and, while the terminal apparatus is connected to the base station after that, the terminal apparatus does not perform notification of capability information.

Note that each terminal apparatus may also notify the base station apparatus of information regarding propagation characteristics between the terminal apparatus and another terminal apparatus, in addition to the capability information. Note that, in the example in FIG. 7, an example is illustrated in which capability information and information regarding propagation characteristics are transmitted at the same time, but the information may be separately notified. A configuration can be adopted in which, for example, as described above, the terminal apparatus performs notification of the capability information thereof when connection with the base station apparatus is established, and then periodically performs notification of information regarding the propagation characteristics. This is because, while capability information does not change during communication, information regarding propagation characteristics may change as the terminal apparatus moves and according to the surrounding environment, for example. Note that a configuration may also be adopted in which, before connection is established, the terminal apparatus measures a signal from a nearby terminal apparatus, and when connection is established, the terminal apparatus notifies the base station apparatus of information that is based on the measurement result.

The base station apparatus 101 performs determination on wireless resources that are allocated for downlink communication and uplink communication of the terminal apparatuses based on the collected information (step S705). Determination on this allocation of wireless resources is performed as in FIGS. 2 and 3, for example. The base station apparatus 101 then allocates wireless resources to the terminal apparatuses in accordance with the determination (step S706), and communicates with the terminal apparatuses using the wireless resources.

As described above, in this embodiment, the base station apparatus performs determination on wireless resources that are allocated to each terminal apparatus that the base station apparatus is to communicates with, based on whether or not the terminal apparatus has the self-interference suppressing capability. That is to say, a terminal apparatus that has the self-interference suppressing capability is allowed to use wireless resources shared between uplink communication and downlink communication, and a terminal apparatus that does not have the capability is not allowed to use wireless resources shared between uplink communication and downlink communication. Accordingly, if a terminal apparatus has the self-interference suppressing capability, effective use of wireless resources is aggressively facilitated, and if the terminal apparatus does not have the capability, loop-back interference can be prevented from occurring. Furthermore, the base station apparatus perform allocation of wireless resources such that an uplink signal transmitted by one terminal apparatus is prevented from interfering with a downlink signal that is received from the base station apparatus by another terminal apparatus, by obtaining information regarding the propagation characteristics between the terminal apparatuses. Accordingly, in the wireless communication system that adopts the full-duplex communication scheme, it is possible to perform efficient wireless resource allocation that improves the frequency usage efficiency while suppressing the influence of interference.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A terminal apparatus comprising:
a notification unit configured to notify, when transmitting an uplink second signal to a base station apparatus using a wireless resource that is used when receiving a downlink first signal transmitted from the base station apparatus, the base station apparatus of information indicating whether or not the terminal apparatus has a capability of suppressing influence of interference of the second signal on the first signal.

2. The terminal apparatus according to claim 1,
wherein the notification unit further notifies the base station apparatus of information regarding propagation loss when the terminal apparatus receives a signal transmitted from another terminal apparatus or the other terminal apparatus receives a signal transmitted by the terminal apparatus.

3. The terminal apparatus according to claim 2,
wherein information indicating that the propagation loss is larger than a predetermined value indicates that (1) the same wireless resource is allowed to be allocated for reception of a first signal by the terminal apparatus and transmission of an uplink signal by the other terminal apparatus, and (2) the same wireless resource is allowed to be allocated for reception of a downlink signal by the other terminal apparatus and transmission of the second signal by the terminal apparatus.

4. The terminal apparatus according to claim 1,
wherein the base station apparatus executes allocation of a wireless resource to be used for communication between the base station apparatus and the terminal apparatus, based on information indicating whether or not the terminal apparatus has the capability notified by the notification unit.

5. The terminal apparatus according to claim 4,
wherein information indicating that the terminal apparatus does not have the capability is used for causing the base station apparatus to perform the wireless resource allocation such that wireless resources for reception of the first signal and transmission of the second signal are not the same.

6. The terminal apparatus according to claim 4,
wherein the information indicating that the terminal apparatus has the capability indicates that the same wireless resource is allowed to be allocated for reception of the first signal and transmission of the second signal.

7. A base station apparatus comprising:
an obtaining unit configured to obtain, when a terminal apparatus transmits an uplink second signal to the base station apparatus using a wireless resource that is used when the terminal apparatus receives a downlink first signal transmitted from the base station apparatus, information indicating whether or not the terminal apparatus has a capability of suppressing influence of interference of the second signal on the first signal; and
an executing unit configured to execute allocation of a wireless resource that is used for communication between the base station apparatus and the terminal apparatus, based on the information.

8. The base station apparatus according to claim 7,
wherein the obtaining unit further obtains information regarding propagation loss when a signal transmitted from another terminal apparatus is received by the terminal apparatus or a signal transmitted by the terminal apparatus is received by the other terminal apparatus, from the terminal apparatus.

9. The base station apparatus according to claim 8,
wherein the executing unit executes the wireless resource allocation on the assumption that (1) the same wireless resource is allowed to be allocated for reception of a first signal by the terminal apparatus and transmission of an uplink signal by the other terminal apparatus and (2) the same wireless resource is allowed to be allocated for reception of a downlink signal by the other terminal apparatus and transmission of the second signal by the terminal apparatus, based on information indicating that the propagation loss is larger than a predetermined value.

10. The base station apparatus according to claim 7, wherein the executing unit executes the wireless resource allocation such that wireless resources for reception of the first signal and transmission of the second signal are not the same, based on information indicating that the terminal apparatus does not have the capability, and executes the wireless resource allocation on the assumption that the same wireless resource is allowed to be allocated for reception of the first signal and transmission of the second signal, based on the information indicating that the terminal apparatus has the capability.

11. The base station apparatus according to claim 7, wherein, when a first beam to be used for communication with the terminal apparatus is different from a second beam to be used for communication with another terminal apparatus, the executing unit executes the wireless resource allocation on the assumption that (1) the same wireless resource is allowed to be allocated for reception of a first signal by the terminal apparatus and transmission of an uplink signal by the other terminal apparatus and (2) the same wireless resource is allowed to be allocated for reception of a downlink signal by the other terminal apparatus and transmission of the second signal by the terminal apparatus.

12. A control method that is executed by a terminal apparatus, the method comprising:
notifying, when transmitting an uplink second signal to a base station apparatus using a wireless resource that is used when receiving a downlink first signal transmitted from the base station apparatus, the base station apparatus of information indicating whether or not the terminal apparatus has a capability of suppressing influence of interference of the second signal on the first signal.

13. A control method that is executed by a base station apparatus, the method comprising:
obtaining, when a terminal apparatus transmits an uplink second signal to the base station apparatus using a wireless resource that is used when the terminal apparatus receives a downlink first signal transmitted from the base station apparatus, information indicating whether or not the terminal apparatus has a capability of suppressing influence of interference of the second signal on the first signal; and
executing allocation of a wireless resource that is used for communication between the base station apparatus and the terminal apparatus, based on the information.

14. A non-transitory computer-readable storage medium that stores a program for causing a computer provided in a terminal apparatus to:
notify, when transmitting an uplink second signal to a base station apparatus using a wireless resource that is used when receiving a downlink first signal transmitted from the base station apparatus, the base station apparatus of information indicating whether or not the terminal apparatus has a capability of suppressing influence of interference of the second signal on the first signal.

15. A non-transitory computer-readable storage medium that stores a program for causing a computer provided in a base station apparatus to:
obtain, when a terminal apparatus transmits an uplink second signal to the base station apparatus using a wireless resource that is used when the terminal apparatus receives a downlink first signal transmitted from the base station apparatus, information indicating whether or not the terminal apparatus has a capability of suppressing influence of interference of the second signal on the first signal; and
execute allocation of a wireless resource that is used for communication between the base station apparatus and the terminal apparatus, based on the information.

* * * * *